United States Patent [19]

Venturelli

[11] 4,423,808

[45] Jan. 3, 1984

[54] APPARATUS FOR UNHOOKING AND TRANSFERRING HUNG ARTICLES, IN PARTICULAR CUTS OF MEAT

[75] Inventor: Rino Venturelli, Savignano S/P, Italy

[73] Assignee: Tecnomec di Venturelli Rino & C.S.n.c., Modena, Italy

[21] Appl. No.: 304,810

[22] Filed: Sep. 23, 1981

[30] Foreign Application Priority Data

Oct. 8, 1980 [IT] Italy ............................ 40081 A/80
Apr. 17, 1981 [IT] Italy ............................ 40043 A/81

[51] Int. Cl.$^3$ ............................................ B65G 37/00
[52] U.S. Cl. .................................... 198/477; 198/486; 198/488; 198/651; 198/653; 17/24
[58] Field of Search ............... 198/473, 477, 488, 486, 198/680, 651, 653; 414/567; 104/93, 97; 105/151, 156; 17/24, 45, 44.2

[56] References Cited

U.S. PATENT DOCUMENTS

| | | |
|---|---|---|
| 2,906,420 | 9/1959 | Garcia, Jr. . |
| 3,255,893 | 6/1966 | Hainer et al. . |
| 3,940,830 | 3/1976 | Anderson et al. .................. 17/24 |
| 4,336,875 | 6/1982 | Minnetti .............................. 198/486 |

FOREIGN PATENT DOCUMENTS

| | | | |
|---|---|---|---|
| 968512 | 6/1975 | Canada ............................... 17/24 |
| 2043569 | 10/1980 | United Kingdom ............... 198/473 |

Primary Examiner—Joseph E. Valenza
Assistant Examiner—Jonathan D. Holmes
Attorney, Agent, or Firm—Darby & Darby

[57] ABSTRACT

An apparatus is disclosed for unhooking and transferring hung articles, such as cuts of meat, from haulage vehicles to sorting and warehousing installations. The apparatus includes a gripping mechanism movable in three respectively orthogonal directions. The gripping mechanism is adapted to withdraw the articles from the hooks on which they are initially hung, and to transfer and re-hang them upon other hooks. The gripping mechanism includes two symmetrically arranged gripping elements. These elements are movable with respect to each other from a first working position at which their respective free extremities are in contact, to a second working position in which the elements are separated by a distance which allows insertion of one of the hooks between them or removal of previously inserted hook.

11 Claims, 12 Drawing Figures

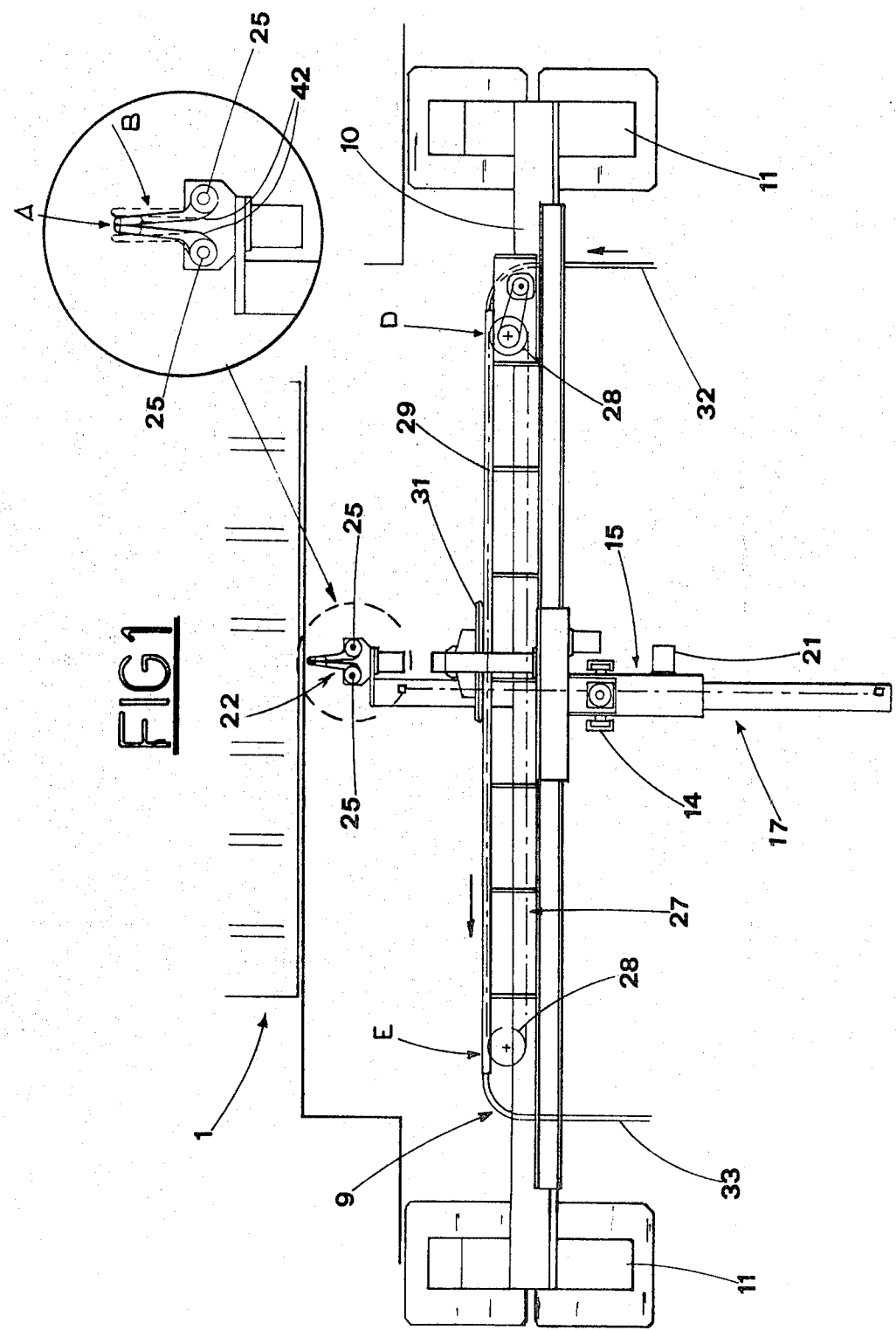

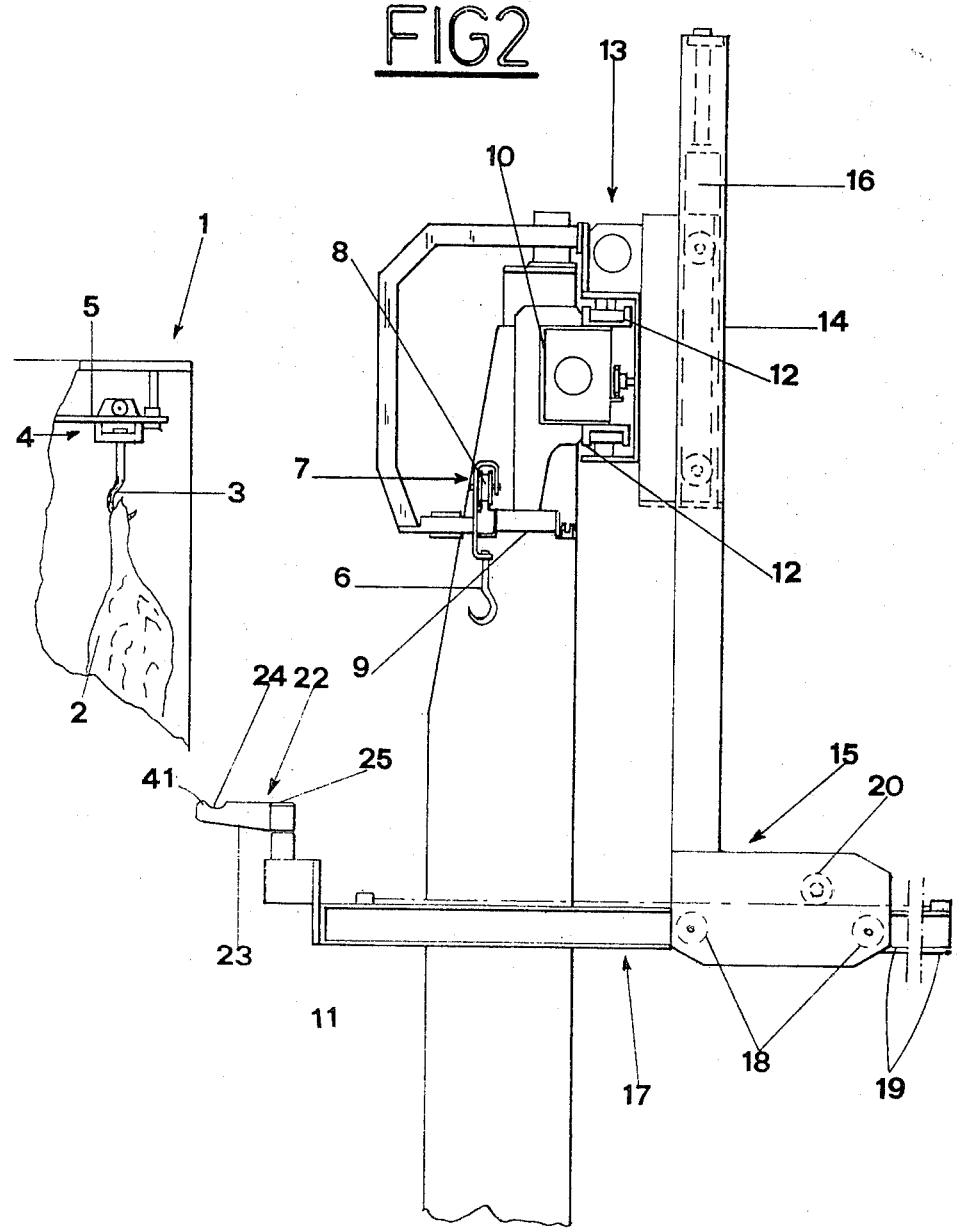

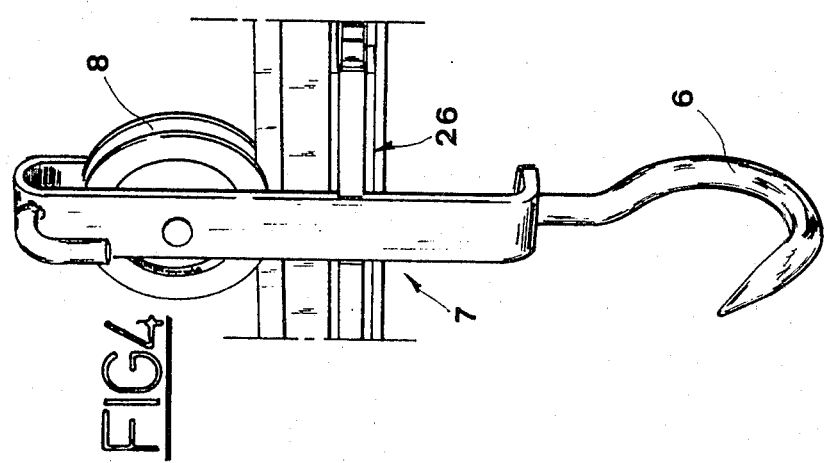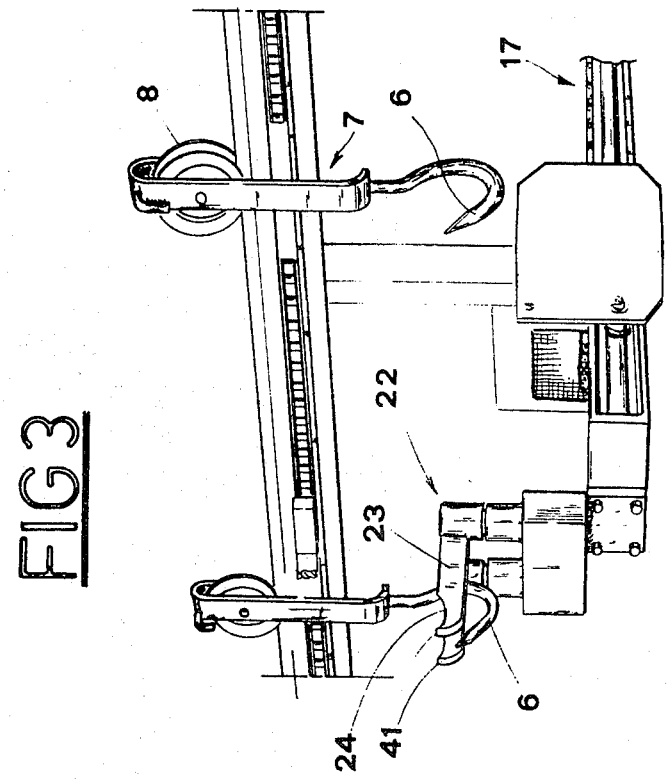

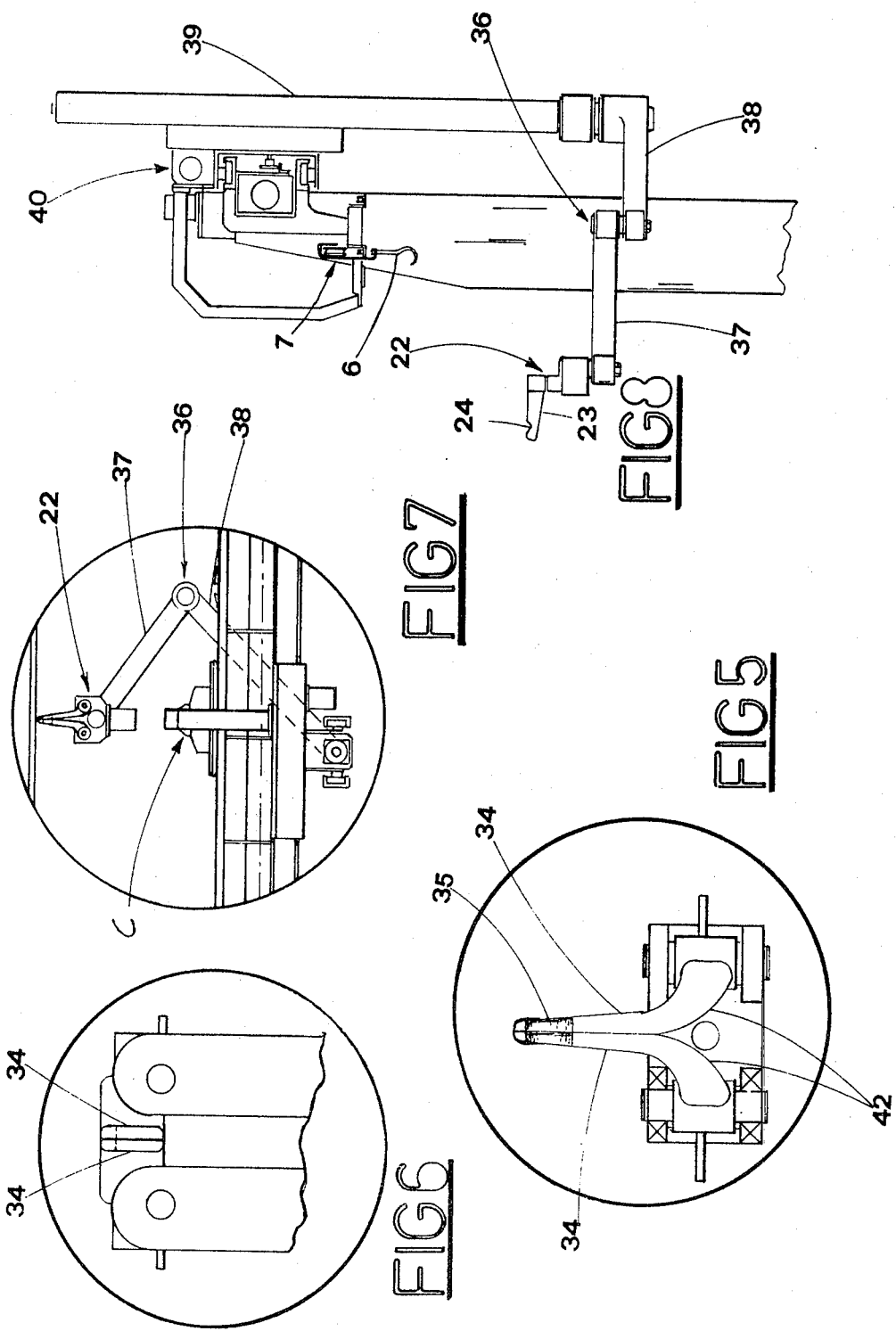

APPARATUS FOR UNHOOKING AND TRANSFERRING HUNG ARTICLES, IN PARTICULAR CUTS OF MEAT

BACKGROUND OF THE INVENTION

The invention relates to an apparatus for unhooking and transferring hung articles, in particular—cuts of meat.

It is ideally,—though not exclusively—, suited to the carrying out of unloading (or loading) and transfer operations such as those wherein halved or quartered carcasses are removed from hooks, inside of haulage vehicles for example, and taken to depots for those subsequent collection, sorting and warehousing stages which provide for preservation and/or further processing (or vice-versa) of the cuts.

The most widely-adopted method for transporting and warehousing cuts of meat is that whereby the cuts are hung up on crook-type hooks which are coupled with an arrangement of overhead rails, or runners, thus permitting their easy transit.

The technical problem which the invention sets out to resolve is that of achieving an automated, mechanical means of transferring the single cuts of meat from the hooks upon which they are hung in a haulage vehicle, to the hooks in the depot or vice-versa.

A transfer operation such as this is beset with considerable difficulties, especially with regard to the stage wherein a cut must be unhooked from a first hook, and to the successive stage wherein it is planted onto another hook. It is particularly important, in the rehooking stage, that the hook's sharpened extremity should penetrate the meat in an appropriately defined area, or that it should be introduced into the strung loop by which the cut of meat is suspended, in order to achieve the correct hang.

The object of the invention described herein is that of resolving the said problem, overcoming the difficulties outlined about by means of an apparatus for unhooking and transferring hung articles, especially cuts of meat, which is simple in operation, and adapts easily to the existing conventional installations used for transporting, collection and warehousing of such said hung cuts of meat.

A further object of the invention is that of providing the gripping mechanism with means capable of sensing the correct position of an article with respect to the gripping mechanism during the loading stage.

A further object of the invention is that of allowing for the correct disposition and locking, as well as unlocking, of the single hook's support element, or bearer, this being linked to and drawn by a chain according to a predetermined fixed position.

SUMMARY OF THE INVENTION

The advantages offered by the invention described herein are ease of manoeuvre and versatility. These and other advantages are achieved by the invention, which relates to an apparatus for unhooking and transferring hung articles, such as cuts of meat.

The apparatus includes at least one movable gripping mechanism designed to unhook, or withdraw, the articles from first hooks on which they have been hung initially, to hold the articles, and transfer them to and re-hang them on second hooks. This gripping mechanism includes two appropriately shaped gripping elements, disposed symmetrically one with respect to the other and capable of movement from at least one first working position, in which they are disposed with, at least, their free extremities in reciprocal contact through the uniting of their opposed surfaces, to at least one second working position in which the same said elements are positioned at that minimum reciprocal distance which allows one of the second hooks to be guided into insertion therebetween, and vice-versa; The gripping mechanism is fastened to the extremity of an arm and capable of movement along three orthogonal paths. The apparatus also includes; an appliance working in conjunction with the gripping mechanism, designed to spot each single hook so as to position it in correspondence with, and center it with respect to the said gripping mechanism. Provision is made at the outward-facing side of each of the gripping elements for at least one tracer element, or tracer point, which senses the article's correct position with respect to the said gripping mechanism in order to ensure the safe hanging of the article upon the gripping mechanism following precise insertion of the gripping elements thereof into it.

BRIEF DESCRIPTION OF THE DRAWINGS

Further characteristics and advantages will emerge more clearly from the detailed description which follows of certain forms of embodiment, illustrated strictly as unlimited examples, with the aid of the accompanying drawings, in which:

FIG. 1 shows a schematic plan of a first form of emdodiment to which the invention relates;

FIG. 2 shows the vertical elevation of a lateral view of FIG. 1;

FIG. 3 shows certain parts of FIGS. 1 & 2 in perspective;

FIG. 4 shows a detail of FIG. 3 in perspective and on a larger scale;

FIG. 5 shows the plan, from above, of a second form of embodiment to which the invention relates;

FIG. 6 shows a frontal, lateral view of of FIG. 5;

FIG. 7 shows the plan, from above, of a third form of embodiment to which the invention relates;

FIG. 8 shows the vertical elevation of a lateral view of FIG. 7;

DESCRIPTION OF THE PREFERRED EMBODIMENTS

Figure 9:
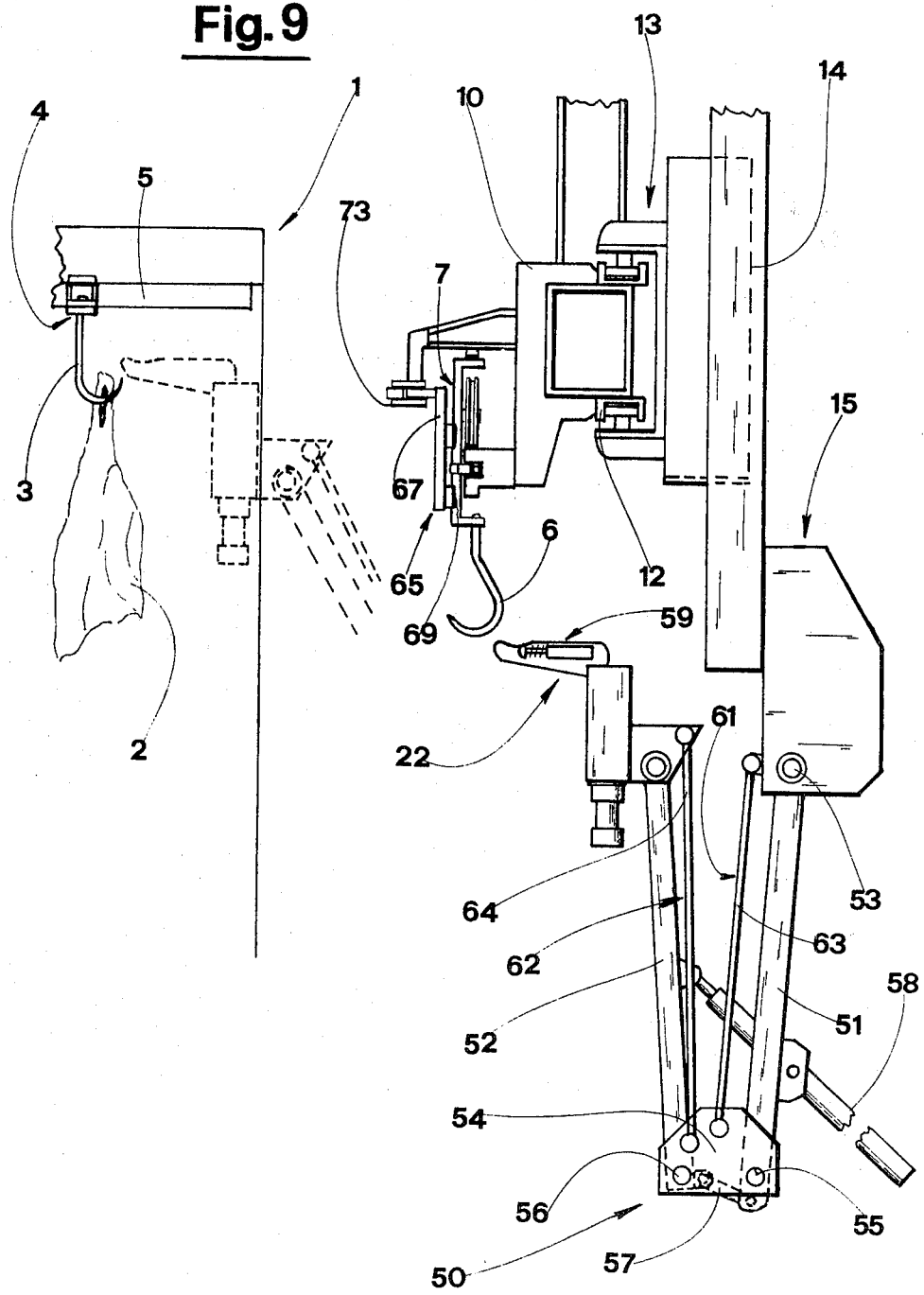
FIG. 9 shows a further vertical elevation of the lateral view of one of the invention's embodiments.

With reference to the above drawings, 1 denotes the general area of a refrigeration compartment designed for containing and preserving cuts of meat 2 hung on first hooks 3 which are assembled with bearers 4 running along parallel guide rails 5 attached to the uppermost region of the said compartment.

The compartment 1 forms part of a haulage vehicle from whence the cuts of meat 2 must be unloaded, and transferred into a warehouse where they may be accommodated by being hung on second hooks 6.

These second hooks 6 are incorporate with further bearers 7 from whose lower end they are suspended so as to rotate around a vertical axis. The bearers 7 are furnished with pulleys 8 by means of which they are free to run along a horizontal guiderail 9, the latter being suitably conjoined with further guiderails inside the warehouse itself. The guiderail 9 is supported by a horizontal traverse 10 therebeneath, the said traverse's 10 extremities borne up by two uprights 11.

The traverse 10 is provided with longitudinally disposed guides 12 along which a carriage is destined to run. The carriage 13 is provided with vertical guides 14 upon which a chassis 15 is designed to run thus. The chassis 15, which is caused to move upon the vertical guides by means of an oil-hydraulic cylinder 16, is furnished at its lower region with a horizontal arm 17, having rectilinear axis, and able to slide thus in a perpendicular direction with respect to the horizontal 12 and vertical 14 guides. The transverse cross-section of the horizontal arm 17, (which is practically speaking an H-section), establishes tracks on which pairs of wheels 18 mounted idle to the chassis 15 may run. The axial movement of the arm 17 is effected by drive transmitted through a linkage comprising a chain 19, disposed parallel with the arm's 17 axis and fixed thereto at both extremities whilst gear-pairing with a sprocket 20 turned by a motor 21 from whence the said drive originates. A gripping mechanism 22 is mounted solidly on the forward extremity of arm 17, the said mechanism 22 performing the function of unhooking the cuts of meat 2 by sliding them off the hooks 3, whereon they were hung at the outset, holding them and, transferring them and depositing them so as to re-hang on further hooks 6. The gripping mechanism 22 comprises two gripping elements 23, appropriately shaped and disposed symmetrically one with respect to the other as well as being capable of movement thus from at least one working position A, in which they are disposed with, at least, their free extremities in reciprocal contact through the uniting of their opposed surfaces, to at least one second working position B in which the same elements are positioned at that minimum reciprocal distance which allows one of the said second hooks 6 to be guided into insertion therebetween, and vice-versa.

The said shaped gripping elements 23 are prolonged somewhat, being disposed horizontally to all intents and purposes, and such that their free extremities present a concave shaped portion facing upwards —24, and rounded-off points 41. The same gripping elements are mounted so as to rotate symmetrically about two parallel and vertical axes by means of pivots 25. The pivots are connected reciprocatingly to the means of such rotation in such a way that the relative movements effected by the gripping elements 23 come about in symmetry, (as illustrated in FIG. 1.) during the transition from working position A to working position B, and vice-versa. In particular, the posture assumed by the actual gripping elements 23 is such that in position B—the working position in which a hook 3 or 6 may be inserted therebetween, the disposition of their 23 reciprocally opposed internal surfaces is a minimum reciprocal distance equivalent to little more than the width of the transverse common to either of the hooks 3 & 6. In fact the said hooks are generally of constantly circular cross-section. More particularly, the elements' 23 reciprocally opposed surfaces show symmetrical entry portions 42 located at the extremity upon which the elements 23 themselves pivot. The entry portions 42 are of shape and dimensions such as will establish a sure means of entry with which to guide and position the single hook 6 (or 3) with respect to the gripping mechanism 22 during the latter's reverse approach toward the hook itself.

In working position A the gripping mechanism 22 may be brought with ease to the point where a cut of meat 2 is hung upon hook 3, and inserted into the meat immediately below the lower extremity of the hook 3, by making use of the gap opened up therein by the hook itself.

The gripping mechanism 22 is then made to penetrate the gap until the extremities of the gripping elements 23 begin to emerge from the opposite side thereof. This position having been gained, rotation of the pivots 25 is effected thus occasioning opening up, or urging apart, of the appropriately shaped gripping elements 23 from position A to position B, and following same, raising up of the chassis 15 in order to lift the half-carcass, or cut of meat 2 from the hook 3 from which it hangs.

During this lifting stage, the gripping elements 23 are sufficiently far apart to permit the insertion and passage therebetween of the lower part of the hook 3. The upward course terminates at the point where the cut of meat 2 is borne up solely by the gripping elements 23, its weight thus no longer bearing down on the hook 3. Once the cut of meat 2 is withdrawn from the hook 3, the gripping mechanism 22 is caused to reverse by dint of the axial slide produced by the arm 17, and hoisted thus in a vertical direction through operation of the chassis 15, this being raised so as to bring the cut 2 into the vicinity of a reference point C, the latter permanently located with respect to the carriage 13, and defining that point whereat one of the bearers 7, furnished at its lower end with said second hook 6, is locked for an instant. The bearer 7 is disposed upon and supported by the horizontal guiderail 9 and is locked with respect thereto by means of an automatic linking/unlinking device 26 carried by a chain 27. The said chain 27 is a continuous loop, and lies in a horizontal plane whilst being tensioned around two cogwheels, or gears 28 having parallel and vertical axes. The forward, rectilinear branch 29 of the chain 27 is guided parallel with, and underneath of the central rectilinear stretch of the horizontal guiderail 9. A number of the said link/unlink devices 26 are disposed along the chain's 27 length at equal distance one from the next, these serving to lock and unlock the single bearer elements 7 to and from the chain, integrating the two when thus locked. The said device 26 engages both sides of the central body portion of each single bearer 7 thus impeding movement of the same in any direction parallel to the chain's 27 axis, or with respect to the chain itself. The link/unlink action is produced automatically during the chain's 27 passage through the incoming area D, at which point the guiderail 9 begins to superpose the forward branch 29 of the chain 27, and through the outgoing area E at which point the guiderail 9 begins to diverge gradually from the forward branch's 29 vertical plane. Reference point C also establishes the location of a laterally disposed guide 31 designed to maintain the single bearer 7 in a stable position when locked onto device 26 in this event impeding its movement in directions perpendicular with respect to the chain 27 and the guiderail 9. The transfer of the cut of meat 2, once loaded onto the gripping mechanism 22, from the latter to the single hook 6 waiting in readiness at the reference point C, comes about in the following manner:— the gripping mechanism 22 is brought to the fore of hook 6, whose pointed extremity must be facing forward, orientated towards gripping mechanism 22, and placed there in such a way that the uppermost surfaces of gripping elements 23, upon which the cut of meat 2 hangs at rest, are disposed at a height greater than that of the point of said hook 6. From the position thus described, gripping mechanism 22 is then reversed, through the action of sliding arm 17 moving axially thus, until such time as the hook's 6 entire lower section is seen to be well inserted between the reciprocally opposed surfaces of gripping elements 23. This position acheived, the pointed extremity of hook 6, plus its entire said lower section, will be inserted completely within the gap produced in the meat by the opening out,—in fact the outward gripping—, of said elements 23. The correct posture for hook 6 during its insertion between gripping elements 23 is achieved without difficulty by dint of the presence of aforementioned entry portions 42. A further downward movement of chassis 15 occasions gradual lowering of the gripping mechanism until that point where the weight of cut of meat 2 rests entirely upon hook 6.

Once the cut 2 is securely hung up on said hook 6 gripping elements 23 are rotated back from working position B to working position A. Gripping mechanism 22, with elements 23 by now lowered beneath the level of hook bottom 6 and thus closed together, is subsequently moved in reverse and withdrawn from cut of meat 2. Gripping mechanism 22 is now ready to carry out a further unhooking and transferring operation meanwhile the cut 2, once loaded onto hook 6, is drawn on by chain 27 one stage in the pre-determined direction along which the carcasses are made to travel guiderail 9. For successful completion of the transfer thus described of a cut of meat 2 from gripping mechanism 22 onto hook 6, it is essential that the hook be orientated as shown in FIG. 3. To this end provision may be made for a position sensor, or transducer, in the region of reference point C, which will be able to signal the correct orientation of hook 6 and hence to stop the chain's 27 movement, or give the command for same to advance a further said stage,—that is, the distance between two consecutive devices 26—, in the event that a single hook 6 should be orientated incorrectly. An alternative solution would be installation of an element with the capacity of grasping said hook and returning it to the correct pre-established orientation. The actual stopping of single bearer 7 at a given point of reference, and the centering of gripping mechanism 22 through threefold orthogonal axial movement with respect to hook 6, are both carried out automatically utilising conventional means.

The entire apparatus which combines in operation with gripping mechanism 22,—comprising amongst other elements chain 27 and guiderail 9—, receives empty bearers 7 from feed-in line 32 which conjoins with guiderail 9. Loaded bearers 7, complete with cut of meat 2, are sent one by one along load take-up line 33. The apparatus thus described clearly lends itself not only to transfer of cuts 2 from hooks 3 of a conventional compartment 1 to hooks 6 of a warehousing installation, but also to transferring of such cuts from said warehouse systems, in other words, from hooks 6, to hooks 3.

In another form of embodiment of the invention the gripping mechanism 22 is furnished with gripping elements 34, these too appropriately shaped and having substantially the same prolonged shape as gripping elements 23, and disposed likewise, to all intents and purposes horizontally, though being pivoted so as to rotate around parallel axes, which whilst providing like symmetrical rotation, are disposed horizontally with respect to the axis of said arm 17. In like manner to elements 23, the free extremities of gripping elements 34 are shaped so as to present an upward-facing concave portion 35, the elements being engaged in reciprocating rotation about their own axes which ensures symmetry of their respective movement, hence of their internal surfaces, which are reciprocally opposed in whatever working position. The gripping elements 34, when in that working position which determines their maximum separation, perform the identical function to that of elements 23,—being to prevent cut of meat 2 hung thereon from slipping off. In addition to its said capacity for three-directional movement along orthogonally disposed planes, gripping mechanism 22 may also be furnished with the capacity to rotate around a vertical axis, in which case the entire chassis 15, or at least its lower section, may be pivoted so as to rotate around such a vertical axis.

A differing form of embodiment of the invention provides for the integration of gripping mechanism 22 with a horizontally disposed articulated arm 36 made up of two members 37 & 38. The articulating horizontal arm 36 is borne up at the lower end of a vertical shaft 39 which slides axially within vertically disposed guides located in a carriage 40 similar in all respects to said carriage 13. The gripping mechanism's 22 forward-/reverse motion is gained by means of rotating the members 37 & 38 making up said arm 36, whilst vertical/lateral movement is obtained by means identical to those described in the first form of embodiment.

In a more simplified form of embodiment, horizontal articulating arm 36 may be mounted onto a vertical post so as to move in a vertical direction with respect to the same.

In a further form of embodiment of the invention the chassis 15 carries an arm at its lower end, the said arm 50 two principal articulating members, these engaging in reciprocation and moving within a vertical plane. The first of said members 51 pivots around a horizontal axis with respect to chassis 15 by means of a pivot 53. The same member 51 is likewise engaged with an intermediate mounting 54 by means of further pivot 55. Intermediate mounting 54 carries another pivot 56 wherewith to engage the second of said members 52. A gripping mechanism 22 borne on the free extremity of second member 52 moves in a fashion parallel to itself regardless of the position taken up by member 52 with respect to member 51.

Reciprocal engagement of members 51 & 52 is brought about by means of a link rod 57, and two rods 63 & 64 which establish respective articulated quadrilaterals 61 & 62. More specifically, the first rod 63 is pivoted at its respective extremities to chassis 15 and to the intermediate mounting 54. Second rod 64 is pivoted at its like respective extremities to the body of gripping mechanism 22, and to intermediate mounting 54. Relative rotation of the members 51 & 52 in the two directions necessary to producing extension and retraction of the arm 50 is effected by means of a double-acting oil-hydraulic mover cylinder 58 which operates between the said members thus producing the horizontal movement necessary to the gripping mechanism's 22 function. A tracer element, or tracer point 59 is located on each of the outward-facing sides of the gripping mechanism's 22 two appropriately shaped elements 23, whose function is that of sensing the correct position of an article,—more specifically a cut of meat 2—, with respect to gripping mechanism 22, hence its readiness for being guided and securely hung thereon. In fact, while in working position A gripping mechanism 22 may be brought into close proximity with hook 3 whereon cut of meat 2 is hung, and introduced into the meat immediately beneath the lower extremity of hook 3 by making use of the gap opened up in the meat by the hook itself, or inserted into the strung loop by which cut of meat 2 is suspended from hook 3. In the event that gripping mechanism 22 fails to penetrate the said gap, or loop correctly—instead, say, one of the mechanism 22 elements 23 outer faces coming into contact with one of the two stretches of the said loop, the other missing the target—then only the one relative tracer point will be activated as a result of incomplete contact.

In a like situation, the apparatus will not proceed with the loading operation whereby the cut of meat is transferred to gripping mechanism 22, as the required command for same is received only by dint of simultaneous activation of the two tracer points.

A locking device 65 incorporate with carriage 13 serves to position correctly, and lock each single bearer 7 linked to and drawn by chain 27 by way of a link/unlink device 26 fixed thereto, in a predetermined permanent location.

The said locking device comprises two horizontal staffs 66 integrated reciprocally with a traverse 67, this fixed to a horizontal, elongated plate 68. The free extremities of staffs 66 present teeth 69, facing toward guiderail 9 and designed to engage with one of the flanks of the body of each single bearer 7 linked to link/unlink device 26, holding same in a vertical position as long as staffs 66 are maintained in contact with the forward surface of bearer body 7.

Plate 68 is provided with a capacity to execute guided movements within a horizontal plane, both in a direction parallel to that of the ongoing motion of chain 27, and in a horizontal direction perpendicular with respect to the latter, this in order to distance staffs 66 from the body of single bearer 7 and vice-versa. Plate 68 is guided thus in its said movements by means of a first stud 70 and a second stud 71, these fixed to two carriage plates 73 integral with said carriage 13. Studs 70 & 71 have parallel axes contained in a common, vertical plane, and are engaged by sliding within an appropriately shaped channel 72 located in plate 68. Springs denoted by 74 & 80 operate between traverse 67 and carriage plates 73 so as to maintain an idle posture in which plate 68, with traverse 67 and stafs 66, lie in close proximity to that position wherein link/unlink device 26 halts bearer 7 so as to carry out either unloading from or loading onto same by means of gripping mechanism 22. In this position,—illustrated in FIG. 4—, bearer 7 is held fast in the correct aspect by the combined influence of guiderail 9, link/unlink device 26, staffs 66 and relative teeth 69; thus bearer 7 is halted, through the action of auxiliary means linked to a transducer 75, and teeth 69—tensioned by said spring 74—urge against the bearer flank.

The actual body of bearer 7 is thus maintained in a vertical position by the combined action of the two teeth 69 upon one flank of the bearer, and of the link/unlink device 26 on the flank opposite.

Figure 12:
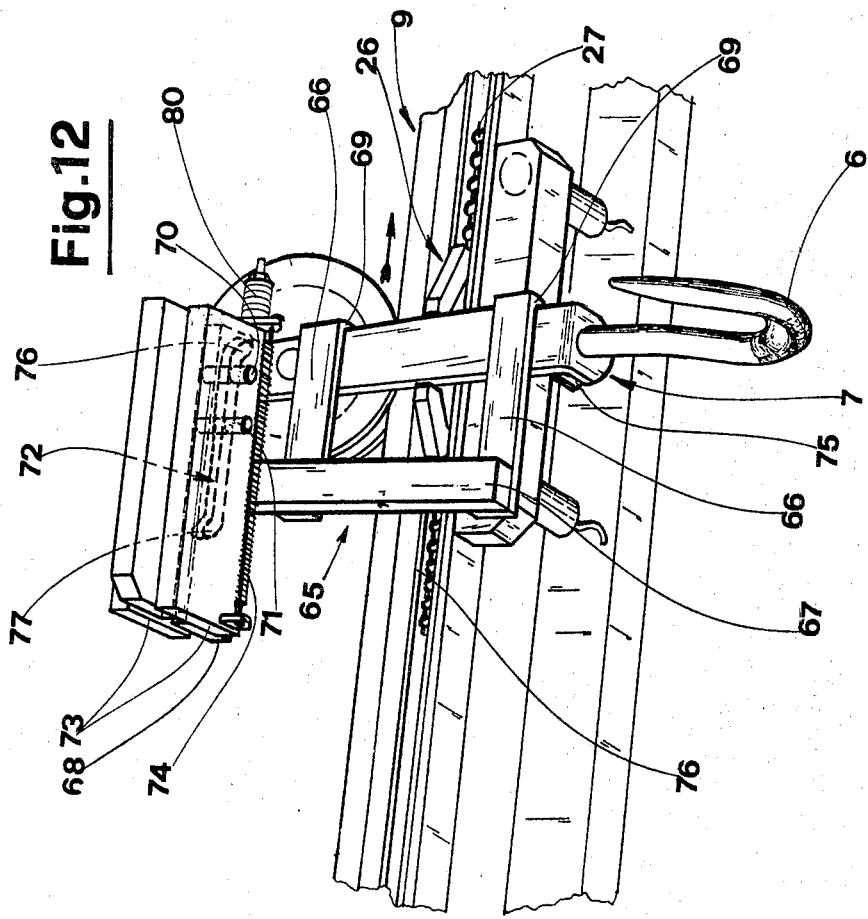
FIG. 12 shows a detail of FIG. 1 in perspective.
Figure 10:
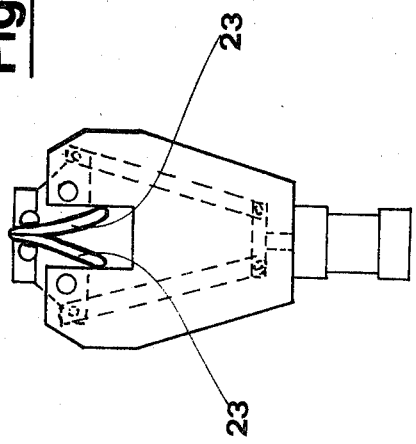
FIG. 10 shows the view from the left of a detail of FIG. 1.
Figure 11:
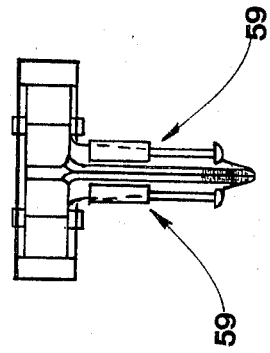
FIG. 11 shows the plan, from above, of FIG. 2.

Disengagement of bearer 7 from the teeth 69 of said staffs 66 is brought about automatically once chain 27 resumes its pre-established left-to-right motion as illustrated in FIG. 12. In fact the movement of plate 68 is prevented only by the inherent elasticity of spring 74. The said channel 72, whilst being disposed for the most part, centrally, in a manner both rectilinear, and parallel with the direction of the movement of chain 27, presents a forward extremity 76 which deviates outward with respect to said central rectilinear section. This said forward extremity 76 obliges first stud 70, which engages therein upon forward movement of plate 68, to move outwards thus distancing the forward section of the plate itself—in particular the teeth 69 of associated staffs 66—from the flank of the bearer 7 body. Once chain 27 resumes its ongoing movement for a short space, locking device 65 frees bearer 7 automatically by moving outward and away from the same. The said channel 72 presents an additional, rearward extremity 77, on this occasion deviating inwardly with the complementary function of engaging second stud 71 during the entire device's 65 movement in reverse from its normal position. Once stud 71 has gained the said extremity 77, by dint of the entire locking device's 65 reverse motion, plate 68—hence staffs 66—rotate/rotates around first stud 70 thus moving away from chain 27.

In this event, a single bearer 7 may be drawn on by chain 27 in the opposite direction to that ongoing motion illustrated in FIG. 12.

The device 65 is returned from thence to its idle position by the action of spring 80.

By way of further elucidation, the exact function performed by device 65 in locking single bearer 7 into a position commensurate with that dictated by the transducer 75, is that of permitting both the unlinking of a single bearer, automatically, during its normal ongoing course, and the linking, or re-insertion of same 7 while travelling the guiderail 9 in a direction contrariwise to that said course.

Numerous modifications of a practical nature may be applied to the constructional particulars of the invention thus described without by any means straying from within the sphere of protection afforded to the concept behind the invention as specified above, and as claimed below:

What is claimed is:

1. An apparatus for unhooking and transferring hung articles, in particular cuts of meat (2), characterised by the fact that it comprises:

at least one movable gripping mechanism (22) designed to unhook or withdraw said articles from first hooks (3) or the like on which they have been hung initially, to hold them thus, and transfer them to and re-hang them on second hooks (6); said gripping mechanism (22) comprising two appropriately shaped gripping elements (23), disposed symmetrically one with respect to the other and capable of movement thus from at least one working position (A) in which they are disposed with, at least, their free extremities in contact through uniting of their opposed relative surfaces, to at least one second working position (B) in which said elements are positioned at that minimum reciprocal distance which allows one of the said second hooks (6) to be guided into insertion therebetween; said gripping mechanism (22) mounted firmly to the extremity of an arm (17, 36 or 50) and movable in three respectively orthogonal directions; provision being made at the outward-facing side of each of gripping elements (23) for at least one tracer point (59) serving to sense said article's correct positioning with respect to gripping mechanism (22) in order to ensure insertion and safe hanging of the former upon the latter;

an appliance working in conjunction with said gripping mechanism (22) designed to spot each of, at least, said second hooks (6) so as to position and centre same correctly with respect to elements (23) of gripping mechanism (22).

2. Apparatus according to claim 1 working in conjunction with gripping mechanism (22), comprises:

a horizontal guiderail (9) disposed parallel with the direction of movement of carriage (13) and accommodating pulley wheels (8) of bearers (7) running thereon from which said second hooks (6) extend beneath;

at least one continuous chain (27) lying in a horizontal plane and tensioned between two wheels having vertical and parallel axes, one branch (29) of which is orientated directly above and/or beneath and parallel with said horizontal guiderail (9); provision being made along the length of chain (27) for a number of like, and respectively equidistant devices (26) serving to link and link automatically to and from each single bearer (7); provision being made for said devices (26) to link up with single bearers (7) automatically during the passage of chain (27) through the incoming area,—that is, at the point where guiderail (9) gradually aligns with the course of branch (29) forming part of chain (27) above and/or below; unlinking brought about in like manner at the point whereat said guiderail (9) diverges gradually from the branch's vertical plane,—in fact, the outgoing area.

3. Apparatus according to claim 2 characterised by the fact that gripping mechanism (22) is firmly attached to the extremity of an articulating arm (50) comprising at least two principal members (51 & 52) engaged reciprocatingly and movable within a vertical plane; first (51) of said members pivoted around a horizontal axis to a chassis (15) moving in horizontal and vertical directions, second (52) of said members bearing gripping mechanism (22) at its actual free extremity; means being provided for maintaining gripping mechanism (22) parallel with itself regardless of the posture assumed by said second member (52) with respect to said first member (51); there being provision for at least one tracer point (59) on the outer side of each of gripping elements (23) serving to sense the correct positioning of a said article with respect to gripping mechanism (22) in order to ensure accurate insertion and secure hanging of the former upon the latter.

4. Apparatus according to claim 3 characterised by the fact that the said means for maintaining gripping mechanism parallel with itself consist of two like articulated quadrilaterals, one for each of said members (51,52), engaging reciprocatingly and articulating with common intermediate mounting element (54); there being also a double-acting oil-hydraulic mover cylinder (58) designed to operate between first and second said members (51 & 52) thus producing movement of the latter (51 & 52) in both directions back and forth, hence extension and retraction of the arm (50).

5. Apparatus according to claim 4 characterised by the fact that said carriage (13) is furnished with a locking device (65) serving to lock single bearers (7), linked to and drawn on by said chain (27), into the correct posture once the same (7) reach(es) a predetermined fixed location; said device (65) comprising two horizontal staffs (66) disposed parallel with the movement of said branch (29) of chain (27) and integrated with traverse (67) in reciprocal fashion, said staffs (66) provided with teeth (69) serving to engage with one flank of the body of single bearer (7) thus holding the latter in a vertical position; traverse (67) being mounted integrally to an elongated horizontal plate (68) furnished with the capacity for guided movement within a horizontal plane in a direction parallel with that of the ongoing motion of chain (27), as well as in a direction perpendicular thereto; said plate (68) being guided thus by means of a first stud (70) and a second stud (71) located on carriage plates (73), the latter reciprocally parallel and integral with the said carriage (13); said studs (70 & 71) having parallel axes and being contained within a common vertical plane, both engaging an appropriately shaped channel (72) located in plate (68) by sliding therein; there being provision made for springs operating between traverse and carriage plates in order to maintain plate (68) in a normally idle posture.

6. Apparatus according to claim 5 characterised by the fact that said channel (72) consists of a central rectilinear section, parallel with the direction of movement aforementioned, and two short sections (76 & 77) constituting differingly orientated extremities with respect to said central section; said extremities, forward (76) and rearward (77) with respect to the normal ongoing motion of chain (27), being orientated with respect to the axis of said central section in such a way that respective engagement by them of said first (70) and second (71) studs produces movement outwards of the foremost portion of plate (68) hence like outward movement of said staffs (66), with their relative teeth (69), away from bearer (7).

7. Apparatus according to claim 1 characterised by the fact that gripping elements (23) are prolonged, to all intents and purposes horizontal, and present appropriately shaped free extremities with upward-facing concave portions (24); said elements (23) being pivoted symmetrically at their opposite extremities around two parallel axes, these being horizontal or thereabouts; rotation around the said axes in either direction being effected in such a way that relative movement described by the two gripping elements (23) be symmetrical.

8. Apparatus according to claim 1 characterised by the fact that the said gripping elements (23) are prolonged, to all intents and purposes horizontal, and show free extremities with an upward-facing concave portion (24); provision being made for said elements (23) to pivot symmetrically on two parallel and vertical axes; rotation in either direction around said axes being effected such that relative movement described by the two gripping elements (23) be symmetrical; provision being made further for symmetrically disposed entry portions (42) forming part of the reciprocally opposed surfaces of said elements (23) and located at the sames' pivoted extremities; the said entry portions (42) being of size and shape such as ensure positive guiding and correct positioning of single second hooks (6) during the gripping mechanism's (22) reverse motion toward the hook (6) itself.

9. Apparatus according to claim 8 characterised by the fact that horizontal arm (17) has rectilinear axis and is mounted so as to slide axially upon a movabble chassis (15); said chassis (15) movable thus movable thus in a vertical direction along vertical guides (14) located in carriage (13), the latter movable in turn along horizontal guides (12) in direction perpendicular to the axis of said arm (17).

10. Apparatus according to claim 1 characterised by the fact that horizontal arm (36) is articulated by way of at least two members hinged reciprocatingly around a vertical axis; first member (38) mounted upon a vertical axis sliding axially along vertical guides, second member (37) bearing the actual gripping mechanism (22) firmly attached at its free extremity.

11. Apparatus according to claim 10 characterised by the fact that said horizontal arm (36) is mounted to a stationary post with vertical axis, being movable either vertically or in rotation with respect to same.

* * * * *